United States Patent
Igawa

(10) Patent No.: US 9,870,191 B2
(45) Date of Patent: Jan. 16, 2018

(54) DISPLAY DEVICE, DISPLAYING METHOD, AND COMPUTER-READABLE RECORDING MEDIUM

(71) Applicant: Masayuki Igawa, Kanagawa (JP)

(72) Inventor: Masayuki Igawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 208 days.

(21) Appl. No.: 14/829,854

(22) Filed: Aug. 19, 2015

(65) Prior Publication Data
US 2016/0054972 A1    Feb. 25, 2016

(30) Foreign Application Priority Data
Aug. 22, 2014    (JP) ................. 2014-169659

(51) Int. Cl.
| | |
|---|---|
| *G06F 3/14* | (2006.01) |
| *G06F 3/147* | (2006.01) |
| *G06F 3/041* | (2006.01) |
| *G06F 3/0354* | (2013.01) |
| *G09G 5/36* | (2006.01) |
| *G09G 5/391* | (2006.01) |

(Continued)

(52) U.S. Cl.
CPC .......... *G06F 3/1431* (2013.01); *G06F 3/0304* (2013.01); *G06F 3/03545* (2013.01); *G06F 3/041* (2013.01); *G06F 3/147* (2013.01); *G06F 3/1423* (2013.01); *G06K 9/00402* (2013.01); *G06K 9/00979* (2013.01); *G09G 5/363* (2013.01); *G09G 5/391* (2013.01); *G09G 5/393* (2013.01); *G09G 2340/02* (2013.01); *G09G 2340/0407* (2013.01); *G09G 2340/0442* (2013.01)

(58) Field of Classification Search
CPC ........ G06F 3/1431; G06F 3/147; G06F 3/041; G06F 3/03545
See application file for complete search history.

(56) References Cited

U.S. PATENT DOCUMENTS

| | | | | |
|---|---|---|---|---|
| 6,882,967 | B2 * | 4/2005 | Levine | .............. H04L 67/40 |
| | | | | 703/25 |
| 2004/0041516 | A1 * | 3/2004 | Watanabe | ........... H01L 27/3237 |
| | | | | 313/498 |

(Continued)

FOREIGN PATENT DOCUMENTS

| | | |
|---|---|---|
| JP | 2013-114373 | 6/2013 |
| JP | 2013-114593 | 6/2013 |

(Continued)

*Primary Examiner* — Abbas Abdulselam
(74) *Attorney, Agent, or Firm* — Oblon, McClelland, Maier & Neustadt, L.L.P.

(57) ABSTRACT

A display device communicates with a terminal device and includes a display unit, an extracting unit, a generating unit, and a transmitting unit. The display unit displays display data including at least one of image data and drawn data corresponding to an operation performed by a user on a screen. The extracting unit extracts a part of the display data specified by the user out of the display data displayed by the display unit. The generating unit generates image data in a form corresponding to the terminal device based on the extracted display data. The transmitting unit transmits the image data to the terminal device.

16 Claims, 21 Drawing Sheets

(51) Int. Cl.
 G09G 5/393 (2006.01)
 G06F 3/03 (2006.01)
 G06K 9/00 (2006.01)

(56) References Cited

U.S. PATENT DOCUMENTS

2010/0321587 A1* 12/2010 Kerofsky ............. G09G 3/3406
 348/730
2011/0283198 A1* 11/2011 Rybak .................. H04L 51/066
 715/738
2012/0162444 A1* 6/2012 Suda ................... G06F 3/03545
 348/207.1
2014/0002471 A1* 1/2014 Yeo ........................... G06T 5/00
 345/581

FOREIGN PATENT DOCUMENTS

| | | |
|---|---|---|
| JP | 2013-134387 | 7/2013 |
| JP | 2014-011808 | 1/2014 |
| WO | WO 2013/137367 A1 | 9/2013 |
| WO | WO 2015/129550 A1 | 9/2015 |

\* cited by examiner

FIG.10

|  | DRAWN DATA |
|---|---|
| #1 | CONDITIONS<br>  NETWORK FAILURE<br>  AT XX POINT |
| #2 | MEASURES<br>  SWITCH TO △△<br>  SYSTEM |
| #3 | PERSONS IN CHARGE<br>  XXXX, XXXX |
| #4 | EXPECTED<br>  RESTORATION<br>  TIME<br>  15:10 |

| | DRAWN DATA | TIME |
|---|---|---|
| #1 | CONDITIONS NETWORK FAILURE AT XX POINT | 20140717143000 |
| #2 | MEASURES SWITCH TO △△ SYSTEM | 20140717143505 |
| #3 | EXPECTED RESTORATION TIME AT S BASE 15:10 | 20140717144518 |
| #4 | EXPECTED RESTORATION TIME AT Y BASE 15:03 | 20140717144610 |

DISPLAY DEVICE, DISPLAYING METHOD, AND COMPUTER-READABLE RECORDING MEDIUM

CROSS-REFERENCE TO RELATED APPLICATIONS

The present application claims priority to and incorporates by reference the entire contents of Japanese Patent Application No. 2014-169659 filed in Japan on Aug. 22, 2014.

BACKGROUND OF THE INVENTION

1. Field of the Invention

The present invention relates to a display device, a displaying method, and a computer-readable recording medium.

2. Description of the Related Art

To urgently transmit information to a distant place, for example, the transmitter side of the information may grasp conditions and consider measures while writing the conditions changing with the lapse of time on a whiteboard or the like. The transmitter side then transmits the contents of the considered measures and informative matters to the receiver side of the information at the distant place with a telephone, an e-mail, or a facsimile, for example. Examples of such a situation include, but are not limited to, communications performed between a control room and on-site persons in charge when a disaster or an accident occurs. The situation is not limited to such a special emergent situation and may occur in various scenes, such as offices, stores, hospitals, factories, roads, railroads, and ordinary homes.

Recently, as disclosed in Japanese Patent Application Laid-open No. 2013-114373, each person on the receiver side of the information is provided with a terminal device, such as a smartphone and a tablet, and they can receive the contents of measures and the informative matters from the transmitter side. The terminal device, for example, can receive and display an image obtained by capturing characters written on the whiteboard via a network.

The screen of the terminal device is smaller than that of the whiteboard. Furthermore, the aspect ratio of the screen of the terminal device is different from that of the screen of the whiteboard. If an image obtained by capturing the screen of the whiteboard is displayed on the terminal device without any change, the image is reduced. In urgent transmission of information to a distant place, this mechanism makes it difficult for the receiver side of the information to readily grasp which content in the image is necessary information.

In view of the disadvantage described above, there is a need to convert information displayed on a screen into image data easily checked on a terminal device and transmit it to the terminal device.

SUMMARY OF THE INVENTION

It is an object of the present invention to at least partially solve the problems in the conventional technology.

According to the present invention, there is provided a display device that communicates with a terminal device, the display device comprising: a display unit that displays, on a screen, display data including at least one of image data and drawn data corresponding to an operation performed by a user; an extracting unit that extracts a part of the display data specified by the user out of the display data displayed by the display unit; a generating unit that generates image data in a form corresponding to the terminal device based on the extracted display data; and a transmitting unit that transmits the image data to the terminal device.

The present invention also provides a displaying method comprising: displaying, on a screen of a display device, display data including at least one of image data and drawn data corresponding to an operation performed at a terminal device by a user; extracting a part of the display data specified by the user out of the display data displayed on the screen; generating image data in a form corresponding to the terminal device based on the extracted display data; and transmitting the image data to the terminal device.

The present invention also provides a non-transitory computer-readable recording medium that contains a computer program that causes a computer to function as: a display unit that displays, on a screen, display data including at least one of image data and drawn data corresponding to an operation performed by a user; an extracting unit that extracts a part of the display data specified by the user out of the display data displayed by the display unit; a generating unit that generates image data in a form corresponding to a terminal device based on the extracted display data; and a transmitting unit that transmits the image data to the terminal device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a diagram of an example of drawn data stored in the electronic blackboard;

DETAILED DESCRIPTION OF THE PREFERRED EMBODIMENTS

Exemplary embodiments of a transmission system 10 according to the present invention are described below in greater detail with reference to the accompanying drawings. The transmission system 10 according to the present embodiment processes information displayed on an electronic blackboard 20, which is an example of a display device, into image data easily checked on a terminal device 30 and transmits it to the terminal device 30.

Entire Configuration of the Transmission System 10

Figure 1:
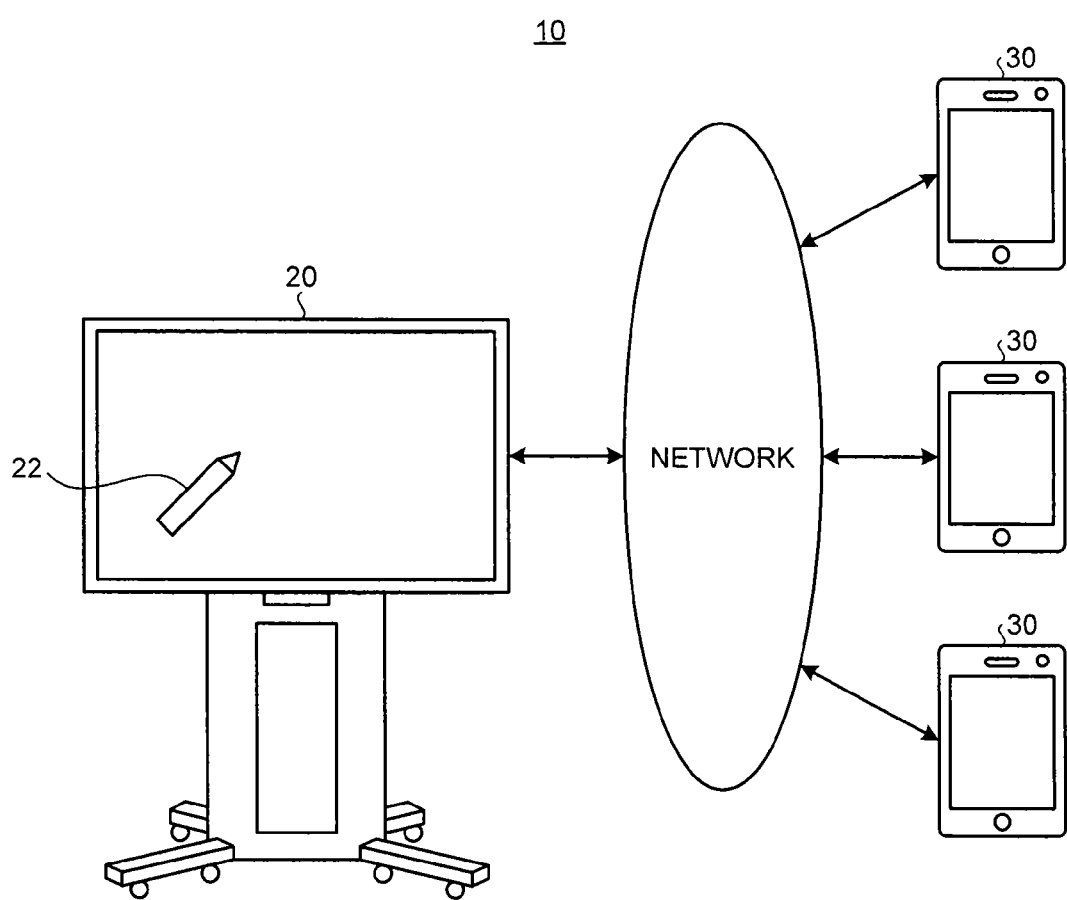
FIG. 1 is a schematic of a transmission system according to an embodiment of the present invention.

FIG. 1 is a schematic of the transmission system 10 according to the embodiment. The transmission system 10 includes the electronic blackboard 20 and a plurality of terminal devices 30.

The electronic blackboard 20 is connected to the terminal devices 30 via a network. The terminal devices 30 are connected to the network by wireless communications. A part of the terminal devices 30 may be connected to the network by wired communications. The electronic blackboard 20 may be connected to the network by wireless or wired communications. The network may be any network, such as a local area network (LAN), a wide area network (WAN), and a WAN including a public line.

The electronic blackboard 20 generates drawn data based on an operation performed by a user on a screen with an electronic pen 22 or the hand, for example, and stores therein the generated drawn data. The electronic blackboard 20 displays the generated drawn data. Thus, the user can draw a character or a figure on the electronic blackboard 20 as if he/she draws the character or the figure on a wall with a pen.

The electronic blackboard 20 is connected to each of the terminal devices 30 via the network to transmit and receive information. The electronic blackboard 20 also functions as a server accessed by the terminal devices 30. Alternatively, the electronic blackboard 20 may be connected to the terminal devices 30 via another server.

The terminal device 30 has a function to output image data (e.g., a display function) and a function to transmit and receive image data. The terminal device 30 is a mobile terminal, such as a smartphone, a tablet, and a mobile phone. Alternatively, the terminal device 30 may be a computer incapable of being carried by the user or a monitor having a communication function, such as an electronic signboard, for example.

The transmission system 10 according to the present embodiment is used as a system for operational communications in an IT system. The electronic blackboard 20 is placed at a base from which instructions are transmitted to a distant place. When a network failure occurs or maintenance is required in the IT system, for example, the electronic blackboard 20 is used to grasp the entire conditions, consider measures, and issue instructions and the like to persons in charge. The terminal devices 30, for example, are provided to the respective persons in charge who perform actual operations, maintenance, and the like and are used to receive informative matters and instructions from the base where the instructions are issued. While the transmission system 10 according to the present embodiment is used as a system for operational communications in an IT system, for example, the transmission system 10 may be used for any group. The transmission system 10, for example, is applicable to immediate transmission and reception of information in various scenes such as offices in general in various industries, stores, hospitals, factories, roads, railroads, and ordinary homes.

Appearance and the Hardware Configuration of the Electronic Blackboard 20

Figure 2:
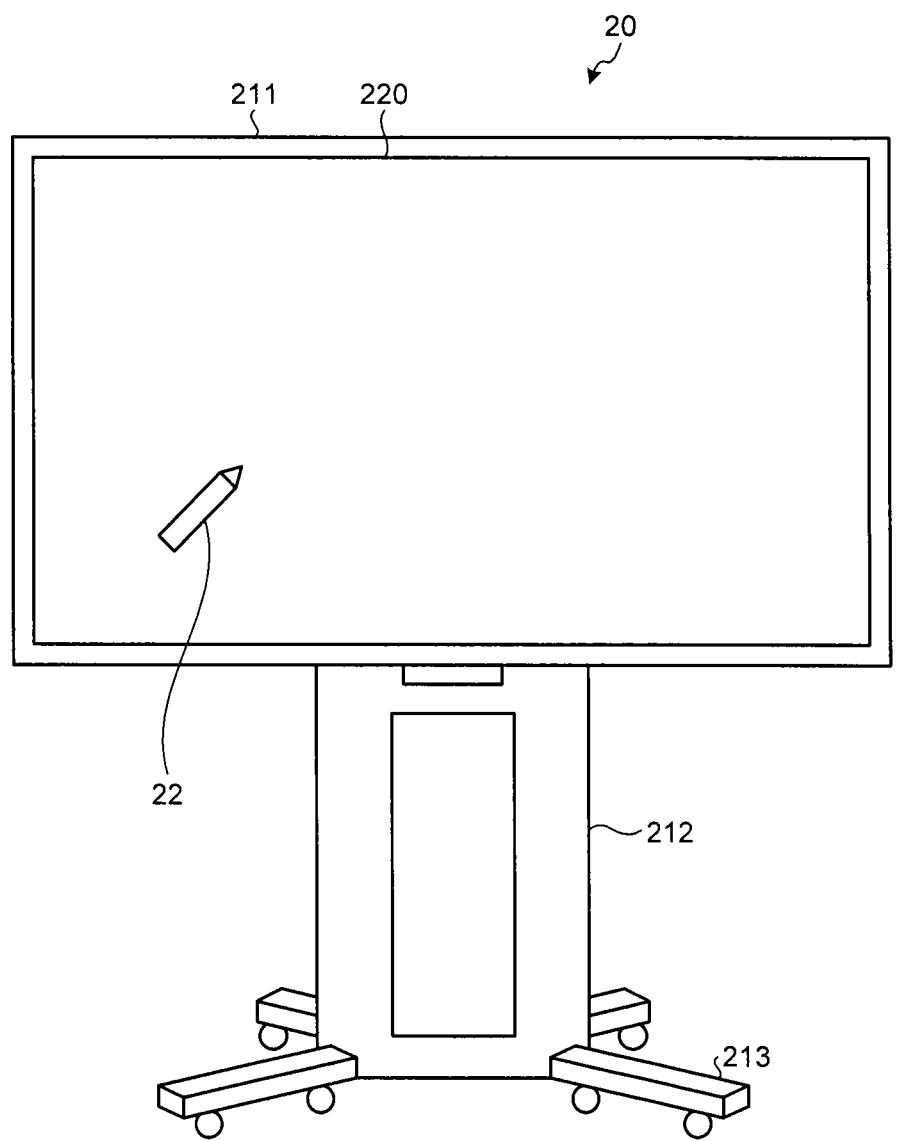
FIG. 2 is a schematic of an exemplary appearance of an electronic blackboard.

FIG. 2 is a schematic of an exemplary appearance of the electronic blackboard 20. The electronic blackboard 20 includes a body 211, a support 212, and legs 213.

The body 211 includes a display 220 and has a main function of the electronic blackboard 20. The support 212 supports the body 211 such that the display surface of the display 220 is vertically arranged. The legs 213 support the support 212 on a floor so as to prevent the electronic blackboard 20 from falling down. The legs 213 are each provided with casters, thereby enabling the electronic blackboard 20 to be moved on the floor. The electronic blackboard 20 receives an operation performed by the user on the display 220 with the electronic pen 22 or the hand and displays drawn data corresponding to the operation performed by the user.

Figure 3:
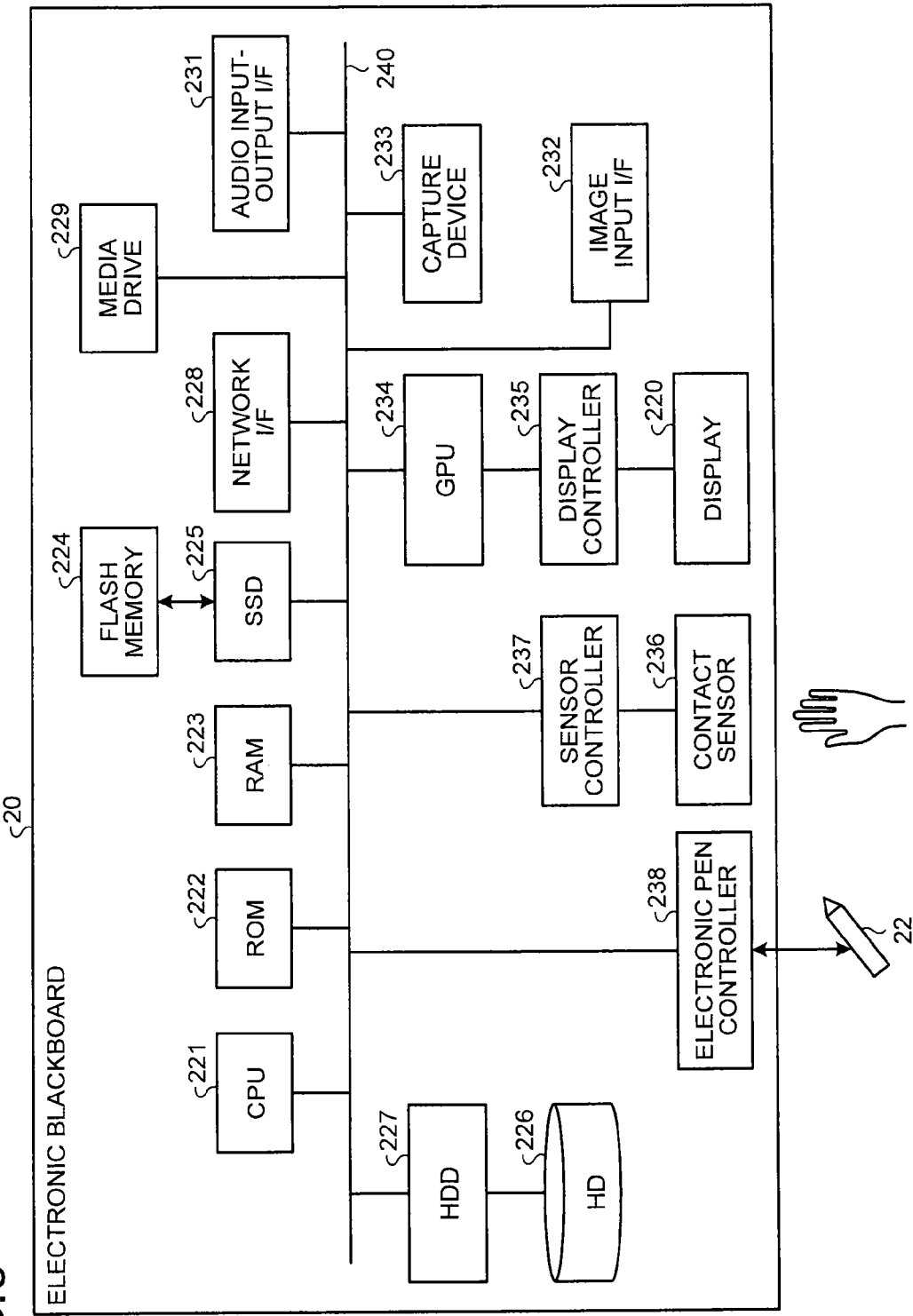
FIG. 3 is a diagram of an exemplary hardware configuration of the electronic blackboard.

FIG. 3 is a diagram of an exemplary hardware configuration of the electronic blackboard 20. The electronic blackboard 20 includes a central processing unit (CPU) 221, a read only memory (ROM) 222, a random access memory (RAM) 223, a flash memory 224, a solid state drive (SSD) 225, a hard disk (HD) 226, a hard disk drive (HDD) 227, a network interface (I/F) 228, a media drive 229, an audio input-output I/F 231, an image input I/F 232, a capture device 233, a graphics processing unit (GPU) 234, the display 220, a display controller 235, a contact sensor 236, a sensor controller 237, an electronic pen controller 238, and a bus line 240.

The CPU 221 controls the entire operation of the electronic blackboard 20. The ROM 222 stores therein a computer program used to drive the CPU 221. The RAM 223 is used as a work area for the CPU 221. The flash memory 224 stores therein various data, such as a control program for the electronic blackboard 20. The electronic blackboard 20 may include an electrically erasable programmable ROM (EEPROM) or the like instead of the flash memory 224. The SSD 225 controls reading or writing of various data from or to the flash memory 224 under the control of the CPU 221.

The HD 226 stores therein data to be provided to the terminal device 30, a computer program, and the like. The HDD 227 controls reading or writing of various data from or to the HD 226 under the control of the CPU 221.

The network I/F 228 controls communications via a network. The media drive 229 controls reading or writing (storing) of data from or to a recording medium, such as a flash memory, attachable to and detachable from the electronic blackboard 20. The audio input-output I/F 231 inputs and outputs audio signals to and from a microphone speaker or the like under the control of the CPU 221.

The image input I/F 232 receives an image captured by a camera. The capture device 233, for example, retrieves a still image or a moving image displayed on a display of another computer. The GPU 234 performs graphics processing. The GPU 234 performs drawing of an image based on information received from the user. The GPU 234, for example, performs processing of synthesizing the drawn image, the image retrieved by the capture device 233, and the image received from the camera. The display controller 235 performs control and management of screen display to output an output image from the GPU 234 to the display 220.

The contact sensor 236 detects a contact operation and input of information performed by the user on the display 220 with the electronic pen 22 or the hand. The sensor controller 237 controls processing performed by the contact sensor 236 under the control of the CPU 221.

The contact sensor 236, for example, inputs and detects coordinates with an infrared-ray interruption system. The coordinates are input and detected as follows: two light receiving and emitting devices (not illustrated) are provided on both ends on the upper side of the display 220 and emit a plurality of infrared rays in parallel with the display 220; a reflection member provided on the periphery of the display 220 reflects the infrared rays; and light receiving elements receive light returned on the same optical path as that of the emitted light. The contact sensor 236 outputs identification (ID) of an infrared ray emitted from the two light receiving and emitting devices and interrupted by an object to the sensor controller 237. The sensor controller 237 identifies a coordinate position corresponding to the contact position of the object.

The contact sensor 236 is not limited to an infrared-ray interruption sensor. The electronic blackboard 20 may include various detecting units, such as a capacitive touch panel that identifies a contact position by detecting a change in the capacitance, a resistive touch panel that identifies a contact position based on a change in the voltage of two facing resistance films, and an electromagnetic induction touch panel that identifies a contact position by detecting electromagnetic induction generated by a contact object coming into contact with a display unit.

The electronic pen controller 238 communicates with the electronic pen 22 to determine whether or not the tip or the bottom of the pen comes into contact with the display 220. The electronic pen controller 238 may determine whether or not a portion of the electronic pen 22 held by the user or other portions of the electronic pen 22 comes into contact with the display 220 besides the tip and the bottom of the electronic pen 22.

The bus line 240 serves as an address bus or a data bus that performs connections between the components, for example.

Appearance and the Hardware Configuration of the Terminal Device 30

Figure 4:
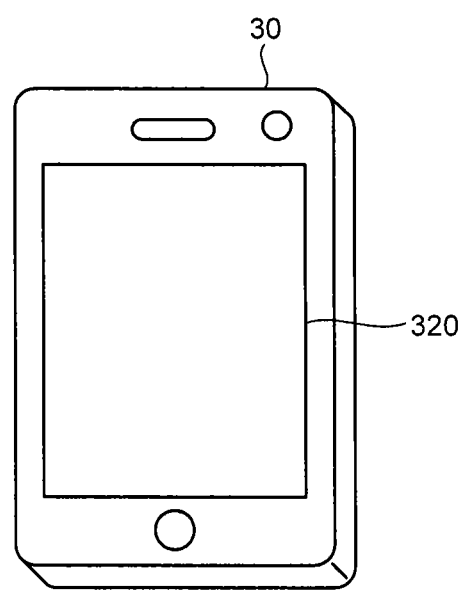
FIG. 4 is a schematic of an exemplary appearance of a terminal device.

FIG. 4 is a schematic of an exemplary appearance of the terminal device 30. The terminal device 30, for example, is an electronic device having a thin-plate shape with a substantially rectangular principal surface and a size small enough for the user to carry in the hand. The terminal device 30, for example, has an information processing function and a communication function similar to those of a computer and can make a telephone conversation. The terminal device 30 includes a touch panel display 320 that displays image data on the principal surface.

Figure 5:
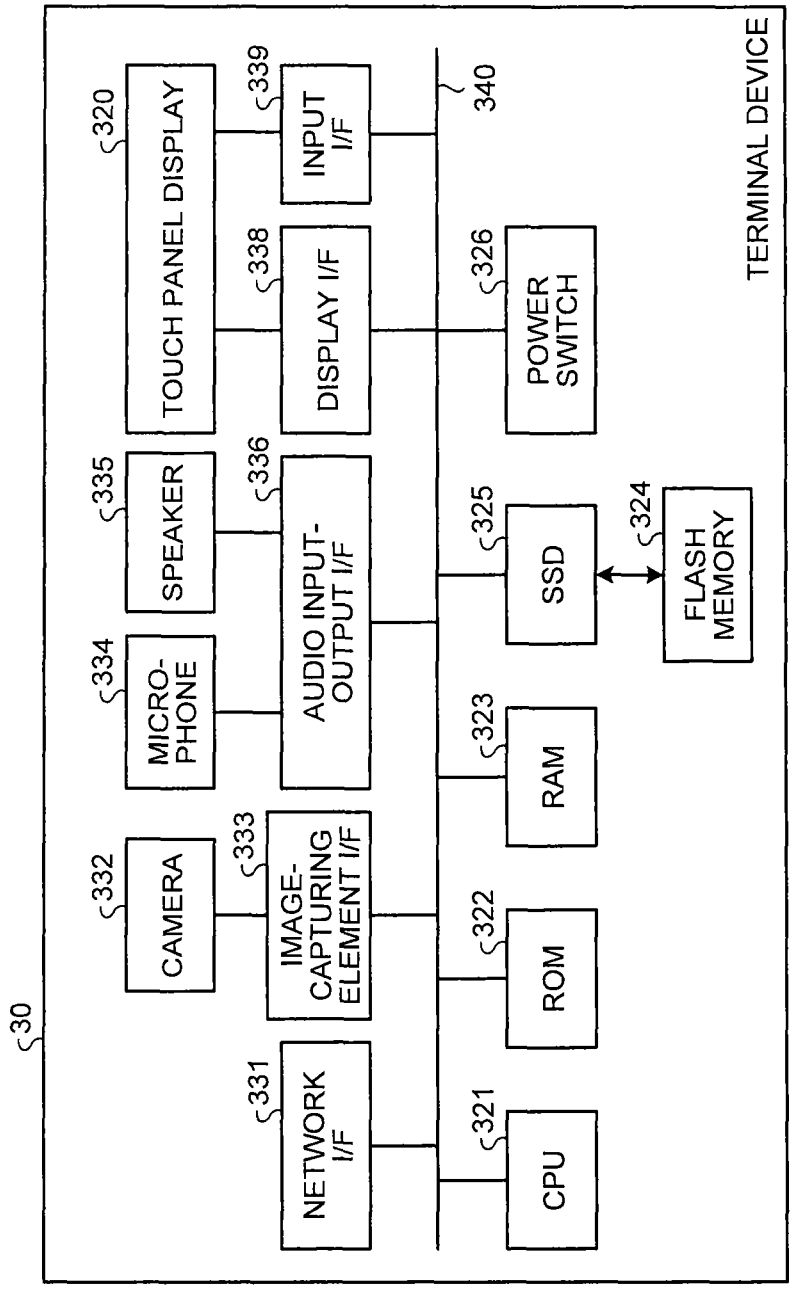
FIG. 5 is a diagram of an exemplary hardware configuration of the terminal device.

FIG. 5 is a diagram of an exemplary hardware configuration of the terminal device 30. The terminal device 30 includes a CPU 321, a ROM 322, a RAM 323, a flash memory 324, an SSD 325, a power switch 326, a network I/F 331, a camera 332, an image-capturing element I/F 333, a microphone 334, a speaker 335, an audio input-output I/F 336, the touch panel display 320, a display I/F 338, an input I/F 339, and a bus line 340.

The CPU 321 controls the entire operation of the terminal device 30. The ROM 322 stores therein a computer program used to drive the CPU 321. The RAM 323 is used as a work area for the CPU 321. The flash memory 324 stores therein various data, such as a control program for the terminal device 30 and image data. The terminal device 30 may include an EEPROM or the like instead of the flash memory 324. The SSD 325 controls reading or writing of various data from or to the flash memory 324 under the control of the CPU 321. The power switch 326 is a button for turning on and off the power supply of the terminal device 30.

The network I/F 331 controls communications via a network. The camera 332 captures a subject under the control of the CPU 321, thereby obtaining image data. The image-capturing element I/F 333 controls the drive of the camera 332. The microphone 334 receives audio, and the speaker 335 outputs audio. The audio input-output I/F 336 inputs and outputs audio signals to and from the microphone 334 and the speaker 335 under the control of the CPU 321.

The touch panel display 320 displays an image corresponding to image data and an operation icon, for example. The touch panel display 320 receives an operation performed on the screen. The display I/F 338 transmits image data to the touch panel display 320 under the control of the CPU 321. The input I/F 339 detects an operation performed on the touch panel display 320. The bus line 340 serves as an address bus or a data bus that connects the components, for example.

Functional Configuration of the Electronic Blackboard 20 and the Terminal Device 30

Figure 6:
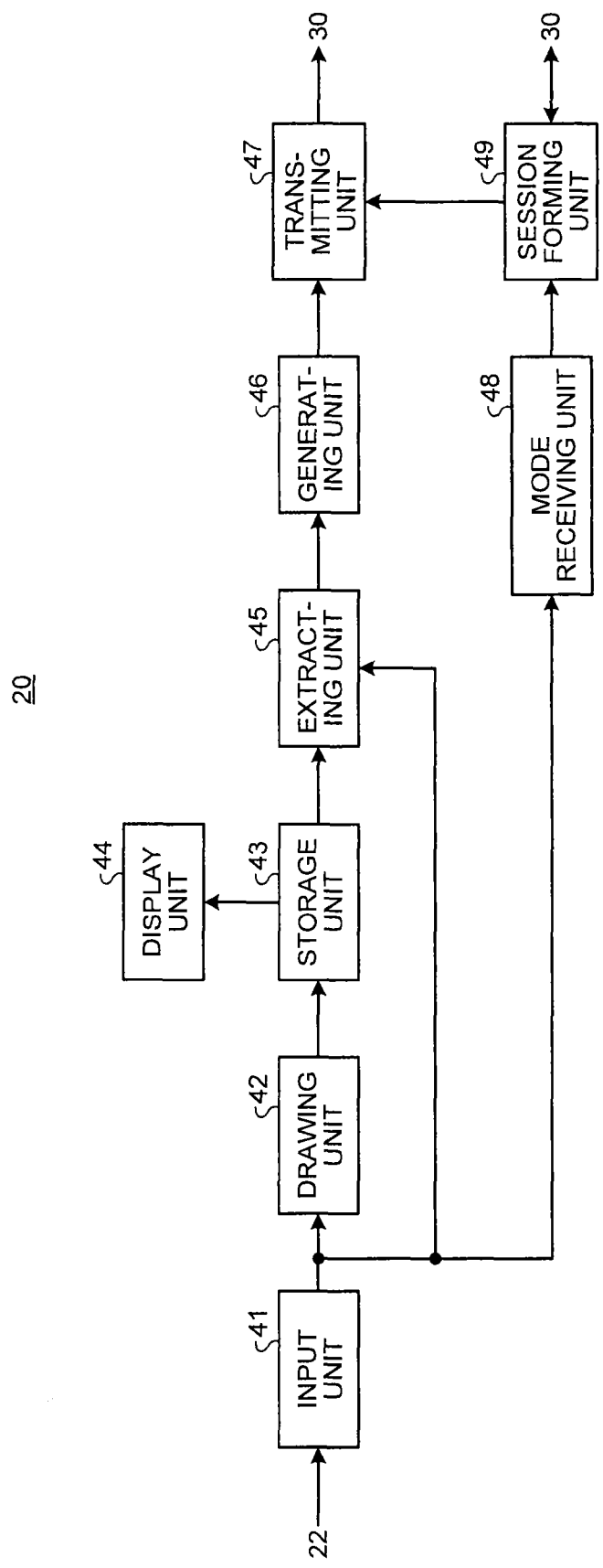
FIG. 6 is a functional block diagram of the electronic blackboard.

FIG. 6 is a functional block diagram of the electronic blackboard 20. The functions of the blocks illustrated in FIG. 6 in the electronic blackboard 20 are provided by the CPU 221 illustrated in FIG. 3 executing a computer program and cooperating with other hardware resources as needed. A part or all of the blocks illustrated in FIG. 6 may be provided as hardware.

The electronic blackboard 20 includes an input unit 41, a drawing unit 42, a storage unit 43, a display unit 44, an extracting unit 45, a generating unit 46, a transmitting unit 47, a mode receiving unit 48, and a session forming unit 49.

The input unit 41 receives an operation performed by the user with the electronic pen 22 or the hand, for example. The drawing unit 42 generates drawn data corresponding to the operation performed by the user and received by the input unit 41. The storage unit 43 stores therein the drawn data generated by the drawing unit 42.

The display unit 44 displays display data including the drawn data stored in the storage unit 43 on the screen of the display 220. The extracting unit 45 extracts a part of the display data specified by the user out of the display data displayed on the screen from the storage unit 43. The generating unit 46 generates image data in a form corresponding to the screen of the touch panel display 320 of the terminal device 30 based on the display data extracted by the extracting unit 45. The form corresponding to the screen of the touch panel display 320 of the terminal device 30 is set in advance, for example. The form corresponding to the screen of the touch panel display 320 of the terminal device 30 may be generated based on information received from the terminal device 30 (e.g., information indicating the aspect ratio of the screen). The transmitting unit 47 transmits the image data generated by the generating unit 46 to each terminal device 30. The storage unit 43 may store therein other image data received by the electronic blackboard 20 from the outside. The storage unit 43, for example, may acquire and store therein image data received from the terminal device 30, image data stored in a detachable recording medium, such as a flash memory, or image data obtained by a reading device, such as a scanner, reading a paper surface. In this case, the display unit 44 displays display data including the image data and the drawn data. The extracting unit 45 extracts a part of the display data including at least one of the image data and the drawn data.

Before the start of an operation, the mode receiving unit 48 receives a mode indicating the contents of the operation from the user. The session forming unit 49 is communicably connected to a part of the terminal devices 30 specified based on the mode out of all the terminal devices 30. The transmitting unit 47 transmits image data to the terminal devices 30 communicably connected to the session forming unit 49.

Figure 7:
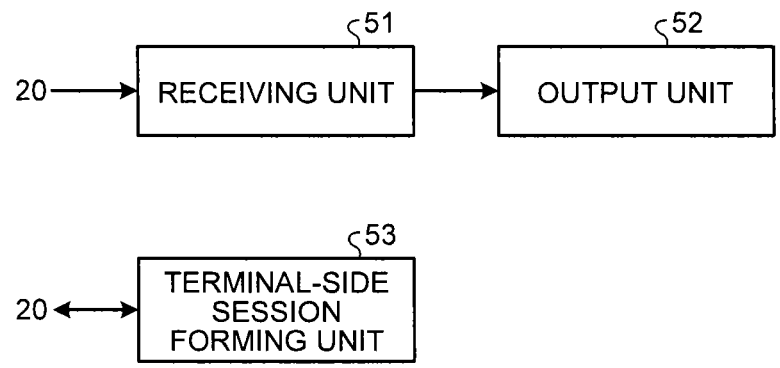
FIG. 7 is a functional block diagram of the terminal device.

FIG. 7 is a functional block diagram of the terminal device 30. The functions of the blocks illustrated in FIG. 7 in the terminal device 30 are provided by the CPU 321 illustrated in FIG. 5 executing a computer program and cooperating with other hardware resources as needed. A part or all of the blocks illustrated in FIG. 7 may be provided as hardware.

The terminal device 30 includes a receiving unit 51, an output unit 52, and a terminal-side session forming unit 53. The receiving unit 51 receives image data transmitted from the electronic blackboard 20. The output unit 52 displays the image data on the screen of the touch panel display 320. The terminal-side session forming unit 53 performs processing of establishing communications with the electronic blackboard 20. When the terminal-side session forming unit 53 establishes communications with the electronic blackboard 20, the receiving unit 51 receives the image data from the electronic blackboard 20.

Processing Flow of the Transmission System 10

Figure 8:
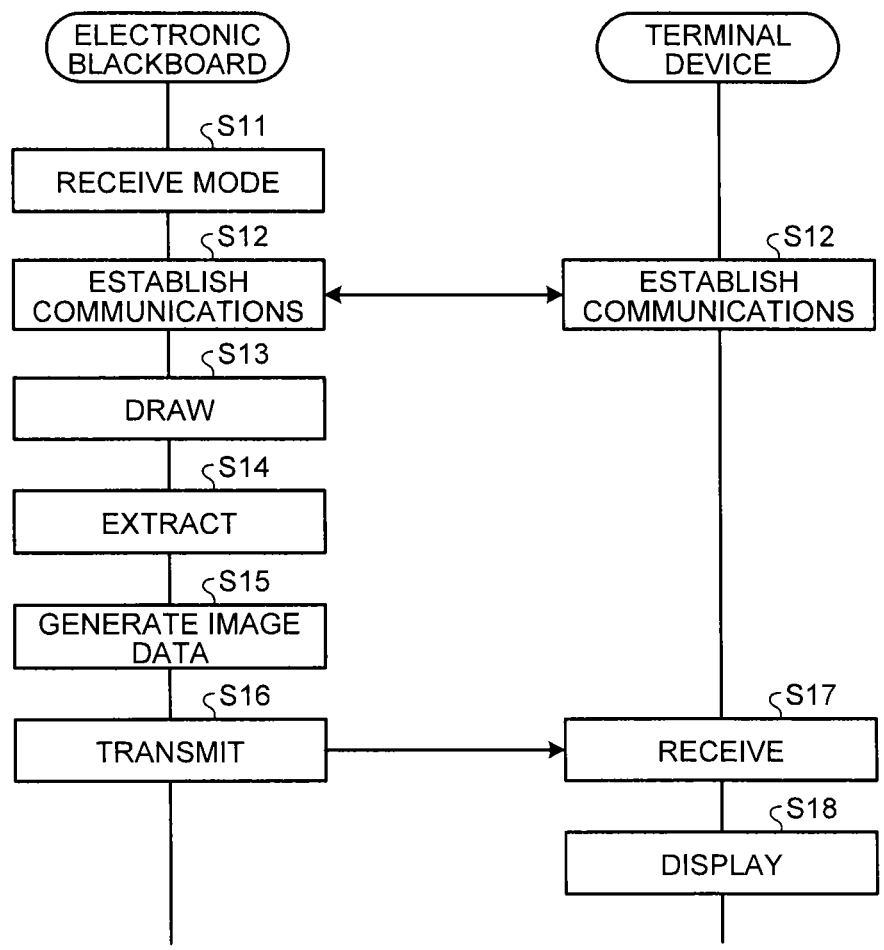
FIG. 8 is a flowchart of processing performed by the transmission system.

FIG. 8 is a flowchart of processing performed by the transmission system 10. To take measures for occurrence of a certain event, the transmission system 10 performs processing of the sequence illustrated in FIG. 8.

At Step S11, the mode receiving unit 48 of the electronic blackboard 20 receives a mode specified by the user. The mode receiving unit 48 may cause the user to select a mode corresponding to the contents of the occurring event from a plurality of modes registered in advance in the electronic blackboard 20. When a network failure occurs, for example, the mode receiving unit 48 may cause the user to select a network failure mode; whereas, when a maintenance operation needs to be performed, the mode receiving unit 48 may cause the user to select a maintenance mode. The network failure mode and the maintenance mode are given by way of example only, and the names of the modes may be changed based on the usage by the user.

At Step S12, the session forming unit 49 of the electronic blackboard 20 establishes communications with a plurality of terminal devices 30. The electronic blackboard 20 establishes communications with the terminal devices 30, thereby enabling push transmission of image data to the terminal devices 30.

The session forming unit 49 may select the terminal devices 30 with which the connection is to be established depending on the mode selected at Step S11. In the network failure mode, for example, the session forming unit 49 establishes connection with the terminal devices 30 provided to all the persons in charge at all the bases. In the maintenance mode, for example, the session forming unit 49 establishes connection with the terminal devices 30 provided to all the persons in charge at a base where a system or a server to be maintained is installed. Thus, the electronic blackboard 20 reliably transmits information to the terminal devices 30 to which informative matters and instructions are to be transmitted and transmits no information to the terminal devices 30 to which no informative matter or no instruction is to be transmitted.

At Step S13, the input unit 41 of the electronic blackboard 20 receives an operation performed by the user on the screen with the electronic pen 22 or the like. The drawing unit 42 of the electronic blackboard 20 generates drawn data drawn by the operation. The storage unit 43 of the electronic blackboard 20 stores therein the generated drawn data. At this time, the display unit 44 of the electronic blackboard 20 displays the drawn data at a corresponding position on the screen.

Figure 9:
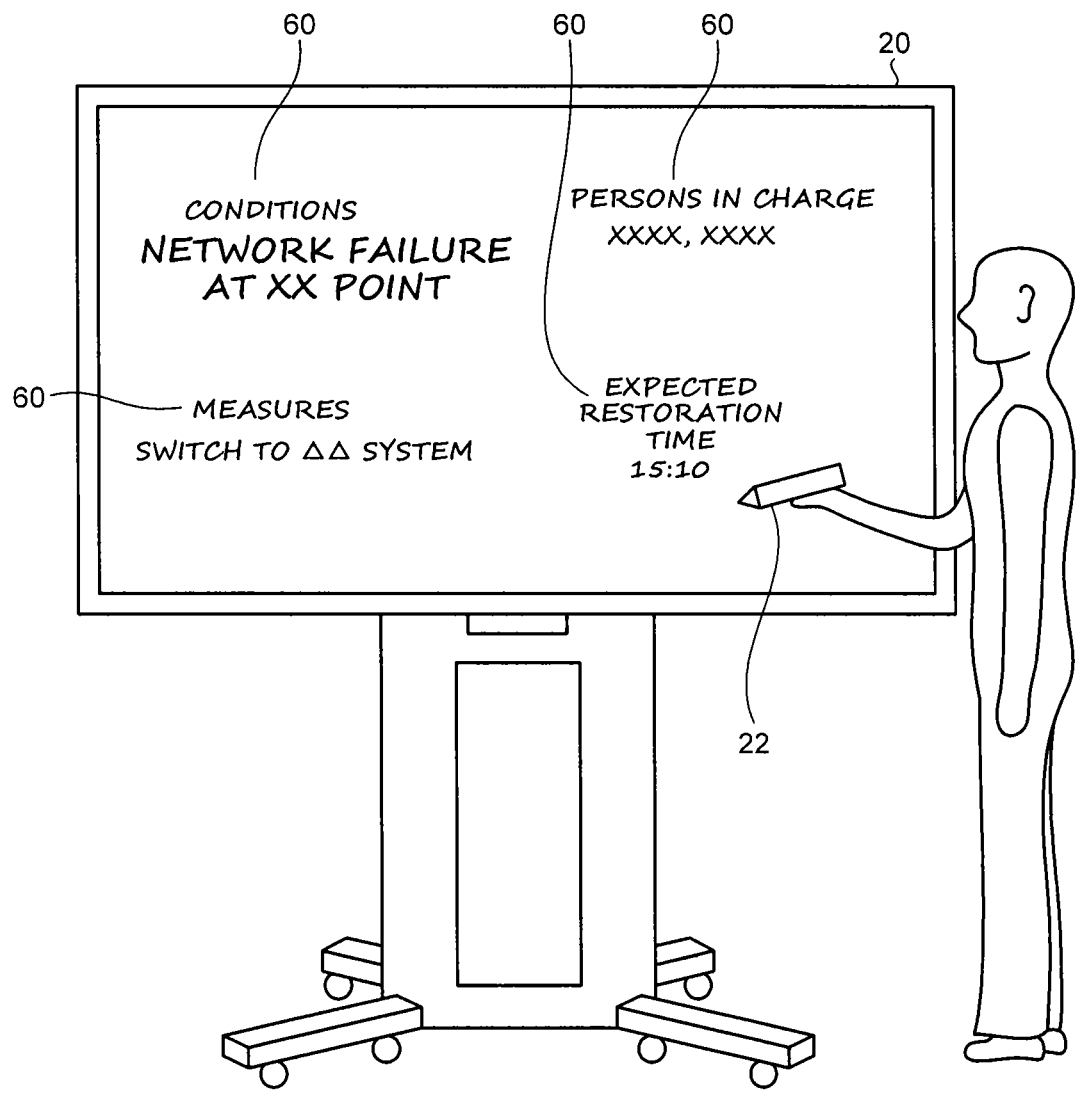
FIG. 9 is a schematic of the electronic blackboard displaying drawn data drawn by an operation performed by a user.

As illustrated in FIG. 9, for example, the electronic blackboard 20 generates drawn data 60 indicating characters or figures drawn on the screen with the electronic pen 22 and stores and displays them.

The drawn data according to the present embodiment is an aggregate of stroke data indicating a trajectory of the electronic pen and a position on the screen in a vector format. As illustrated in FIG. 10, for example, the drawn data is an aggregate of stroke data generated by a series of operations performed from when the user starts writing a character string, a figure, or the like with the electronic pen 22 to when the user finishes the writing of the character string, the figure, or the like. The drawn data may be data in units of characters or the like instead of data in units of character strings or figures. The drawing unit 42 may erase specified drawn data by the input unit 41 receiving a preset erasing operation.

At Step S13, the user at a base from which instructions are to be transmitted according to the present embodiment writes the conditions of the occurring event, measures, persons in charge, and target time of solution of the event (expected restoration time) on the electronic blackboard 20, for example.

At Step S14, the electronic blackboard 20 shifts to an extraction stage in response to a preset operation, such as pressing of a preset button, performed by the user. At the extraction stage, the extracting unit 45 of the electronic blackboard 20 extracts a part of drawn data selected by the user out of the drawn data displayed on the display unit 44 from the storage unit 43.

Figure 11:
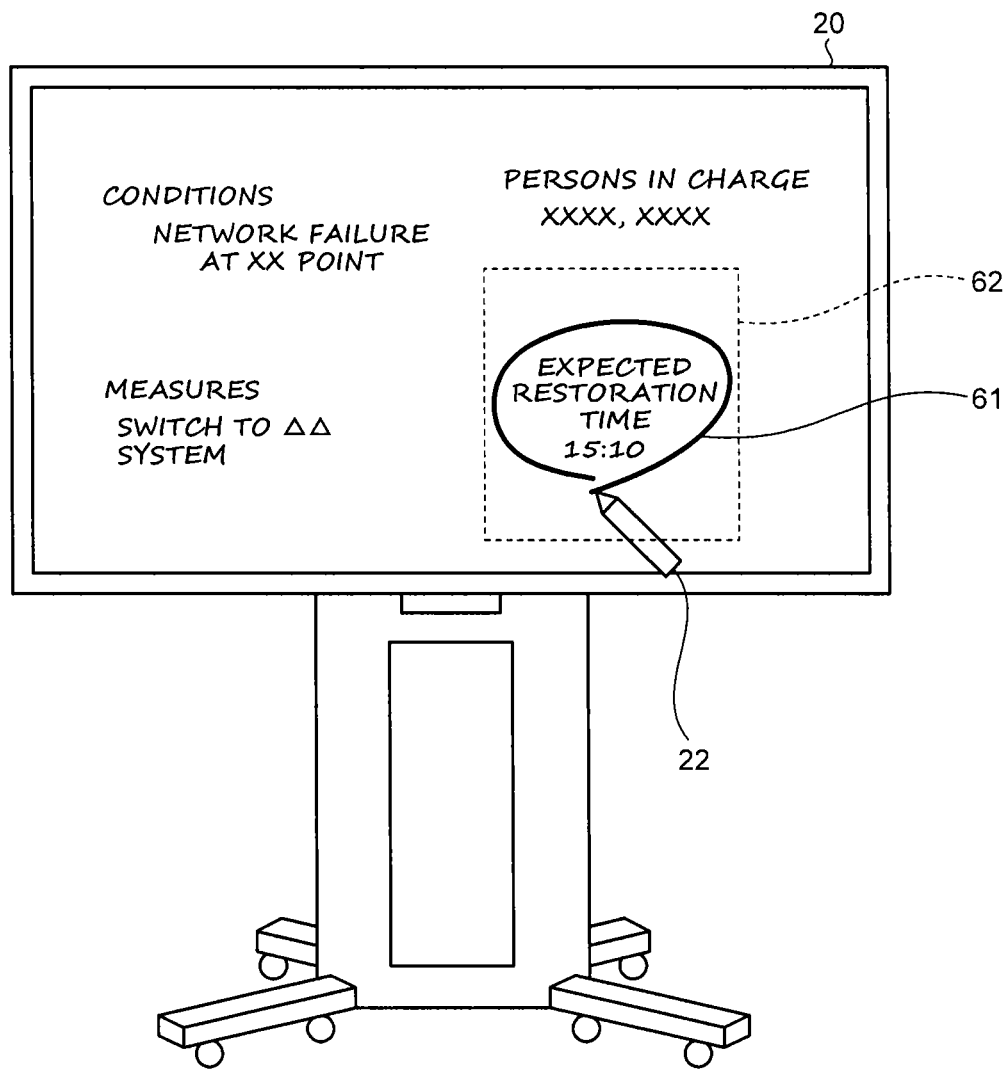
FIG. 11 is a schematic of the electronic blackboard displaying a selection line 61 drawn by an operation performed by the user and a rectangular area specified by the selection line.

As illustrated in FIG. 11, for example, the extracting unit 45 receives the position of a selection line 61 drawn by the user on the screen with the electronic pen 22. The selection line 61 is a substantially circular line made of a free-form curve, for example. The extracting unit 45 extracts drawn data in a rectangular area 62 having a preset aspect ratio and including the area surrounded by the selection line 61. The aspect ratio, for example, is an aspect ratio corresponding to the screen of the output unit 52 of the terminal devices 30. The extracting unit 45 stores therein the aspect ratio in advance.

In this case, the extracting unit 45 may set the rectangular area 62 that includes all the pieces of drawn data at least a part of which overlaps with the area surrounded by the selection line 61. With this setting, in a case where the substantially circular selection line 61 is smaller than the area of the drawn data to be extracted by the user, the extracting unit 45 can extract the drawn data without cutting it in the middle.

At Step S15, the generating unit 46 of the electronic blackboard 20 generates raster image data with an aspect ratio corresponding to the screen of the terminal devices 30 based on the extracted drawn data.

Figure 12:
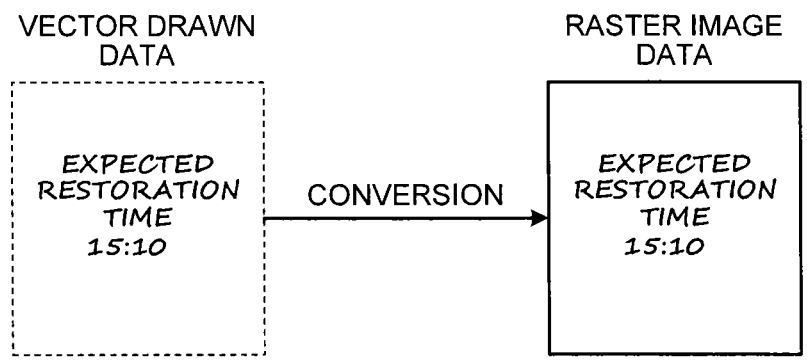
FIG. 12 is a diagram of drawn data extracted from the rectangular area and image data generated by converting the drawn data.

The drawn data extracted at Step S14 is vector data. As illustrated in FIG. 12, the generating unit 46 performs vector-raster conversion on the extracted vector drawn data, thereby converting it into raster image data with an aspect ratio of the screen of the terminal devices 30. The generating unit 46, for example, converts the drawn data into image data in a joint photographic experts group (JPEG) format, a bitmap format, or a portable document format (PDF). The generating unit 46 may convert the resolution of the image data into resolution corresponding to the touch panel display 320 of the terminal devices 30.

Figure 13:
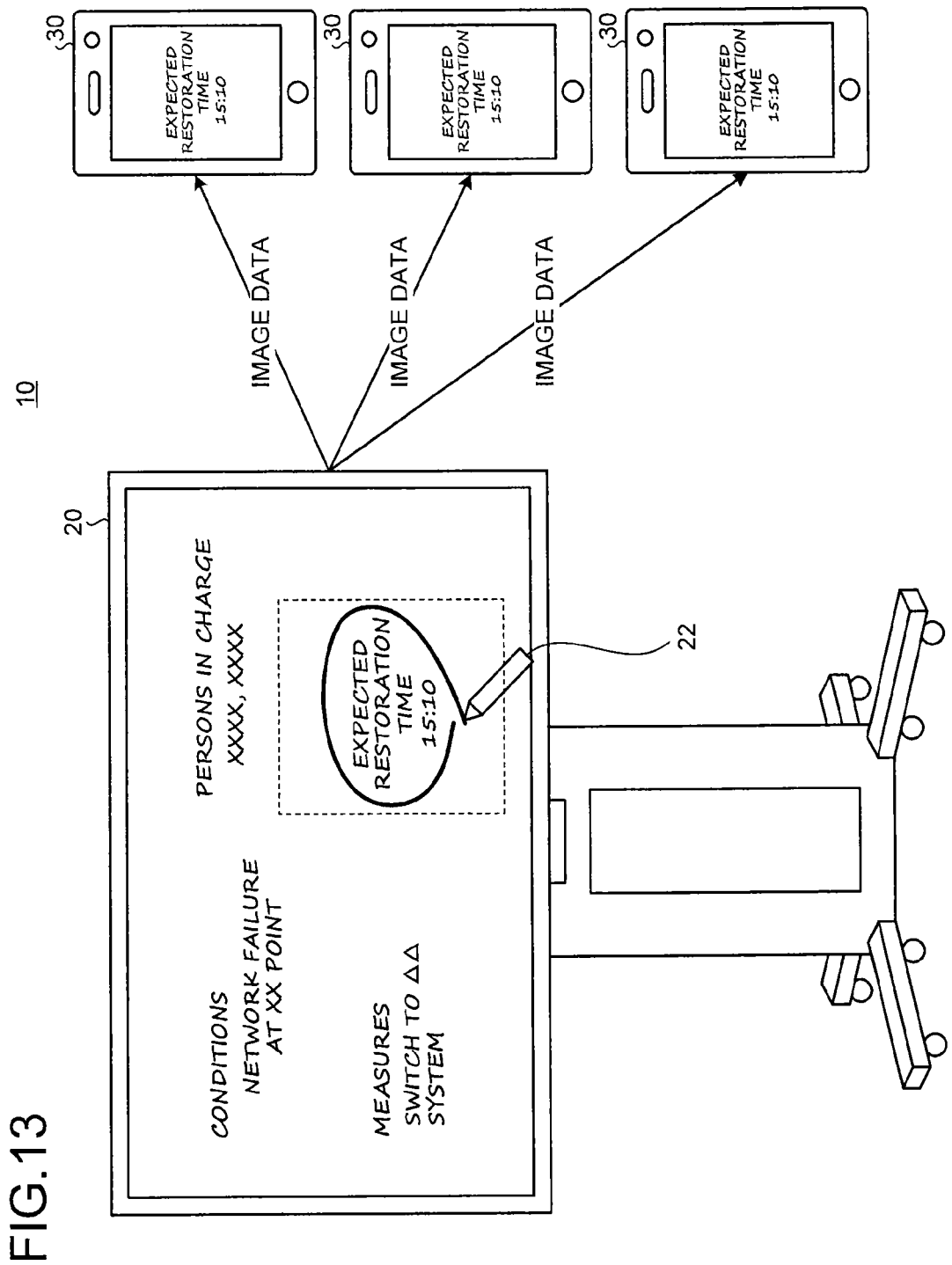
FIG. 13 is a schematic of the transmission system transmitting the image data from the electronic blackboard to the terminal devices.

At Step S16, the transmitting unit 47 of the electronic blackboard 20 performs broadcast transmission of the generated image data to each of the terminal devices 30 as illustrated in FIG. 13. At Step S17, the receiving units 51 of the respective terminal devices 30 receive the image data from the electronic blackboard 20. At Step S18, the output units 52 of the respective terminal devices 30 display the received image data.

As described above, the transmission system 10 according to the present embodiment extracts a part of drawn data displayed on the electronic blackboard 20 and generates image data in a form corresponding to the aspect ratio of the screen of the terminal device 30. The transmission system 10 transmits the image data from the electronic blackboard 20 to the terminal device 30 and causes the terminal device 30 to display it. Thus, the transmission system 10 according to the present embodiment can convert information displayed on the electronic blackboard 20 having a relatively large screen into image data easily checked on the terminal device 30 having a relatively small screen and cause the terminal device 30 to display it. The present embodiment extracts a part of the drawn data displayed on the electronic blackboard 20, for example. In a case where the electronic blackboard 20 displays other image data received from the outside, all the pieces of display data displayed on the screen are to be extracted. In this case, the transmission system 10 extracts a part of the display data including at least one of the image data and the drawn data and generates image data in the form corresponding to the aspect ratio of the screen of the terminal device 30.

Figure 14:
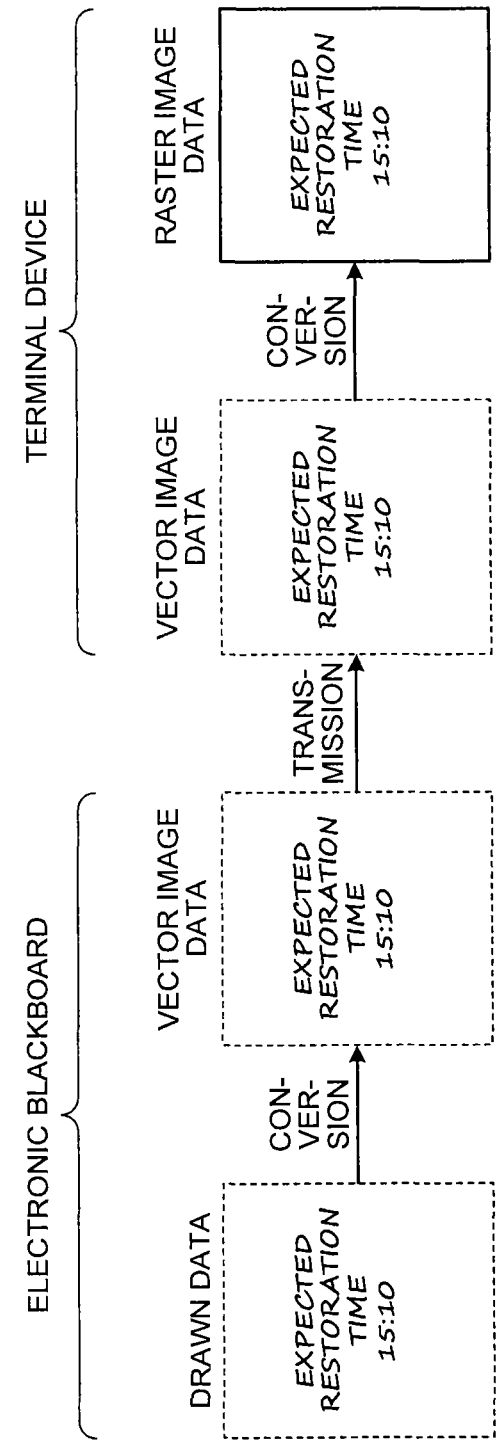
FIG. 14 is a diagram of processing of transmitting vector image data from the electronic blackboard to the terminal device.

FIG. 14 is a diagram of processing of transmitting vector image data from the electronic blackboard 20 to the terminal device 30. The terminal device 30 may possibly be capable of displaying vector image data. In this case, the electronic blackboard 20 may generate vector image data corresponding to the form of the screen of the terminal device 30 based on the extracted drawn data as illustrated in FIG. 14. In this case, the electronic blackboard 20 converts the coordinates in the extracted drawn data into the coordinates in the screen size with the aspect ratio corresponding to the screen of the terminal device 30.

When receiving the vector image data from the electronic blackboard 20, the terminal device 30 converts the received vector image data into raster image data and displays it. In a case where the terminal device 30 can display vector image data as described above, the electronic blackboard 20 may display vector image data on the terminal device 30. To transmit the vector image data to the terminal device 30, the electronic blackboard 20 can reduce the transfer amount of the data.

First Modification

Figure 15:
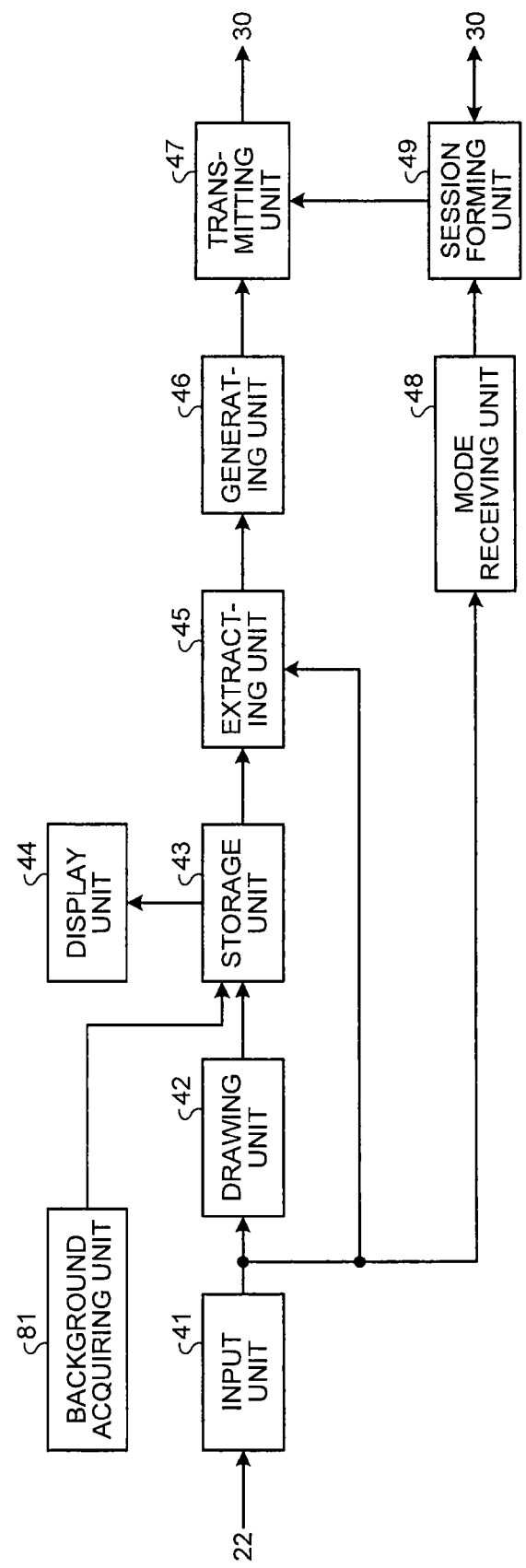
FIG. 15 is a functional block diagram of the electronic blackboard according to a first modification.
Figure 16:
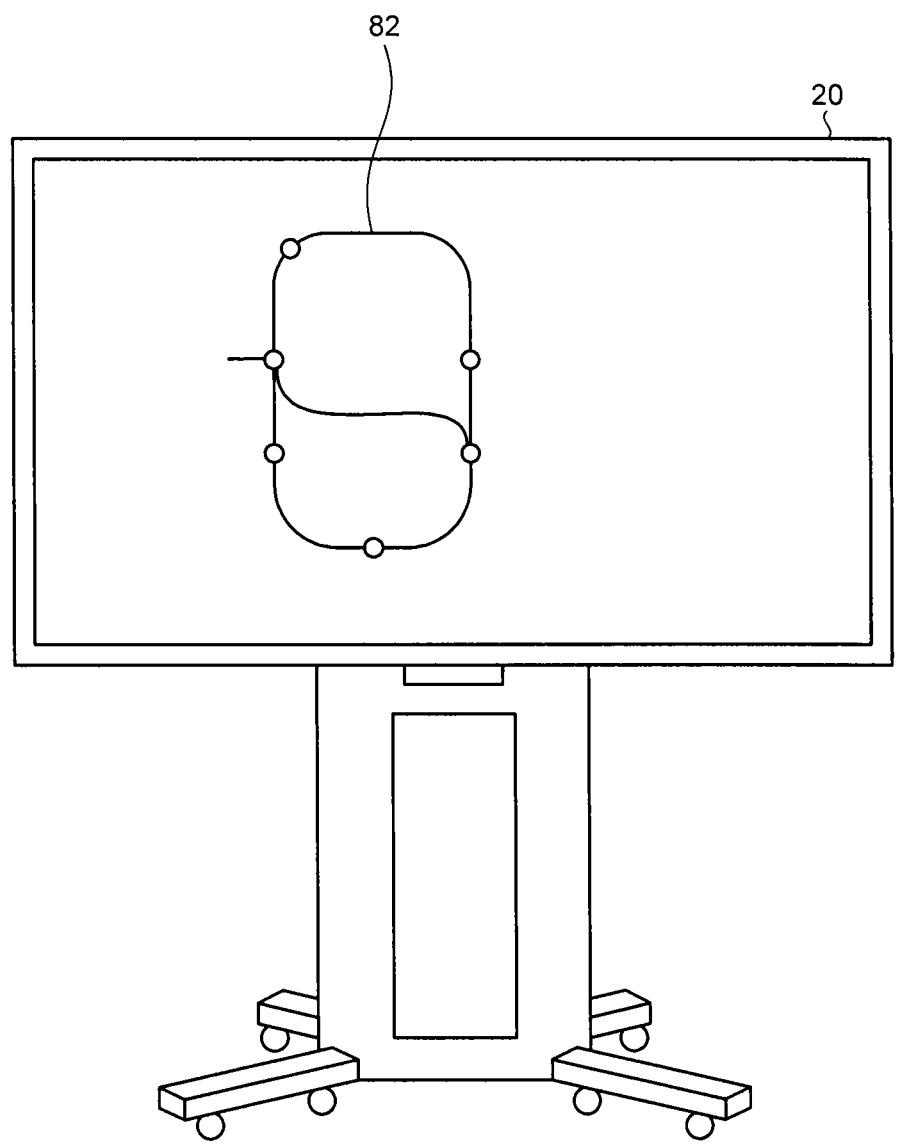
FIG. 16 is a schematic of the electronic blackboard displaying background data.

FIG. 15 is a functional block diagram of the electronic blackboard 20 according to a first modification. FIG. 16 is a schematic of the electronic blackboard 20 displaying background data 82.

The transmission system 10 according to the first modification has a configuration and functions substantially the same as those described with reference to FIGS. 1 to 14. The following describes differences from the configuration described with reference to FIGS. 1 to 14.

The electronic blackboard 20 according to the first modification further includes a background acquiring unit 81. The background acquiring unit 81, for example, acquires background data from the outside. The storage unit 43 stores therein the background data acquired by the background acquiring unit 81. The display unit 44 displays the background data stored in the storage unit 43 on the screen.

The background acquiring unit 81 may receive background data from an external computer or a recording medium, for example. Furthermore, the background acquiring unit 81 may receive information included in an e-mail as background data, for example.

When a mode is set, the background acquiring unit 81 may acquire background data corresponding to the specified mode. When the network failure mode is selected, for example, the background acquiring unit 81 may acquire background data indicating a configuration diagram of the entire network illustrated in FIG. 16. When the maintenance mode is selected, for example, the background acquiring unit 81 may acquire background data indicating a network configuration to be maintained. Thus, the drawing unit 42, for example, can display drawn data written by the user (e.g., a mark indicating the position of the event, such as a network failure) in a manner superimposed on the background data.

Figure 17:
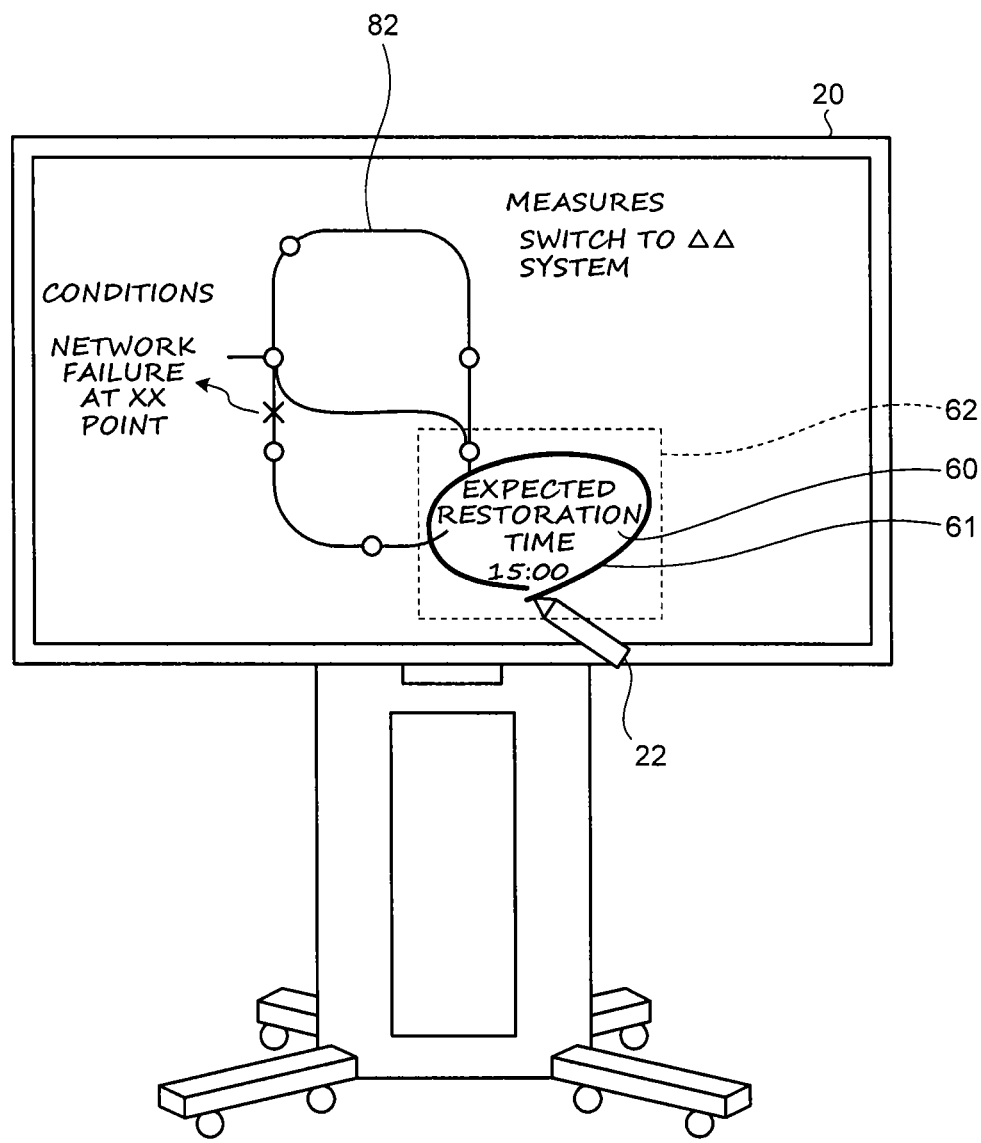
FIG. 17 is a schematic of a first example of the electronic blackboard displaying the selection line drawn on the background data, and the rectangular area.
Figure 18:
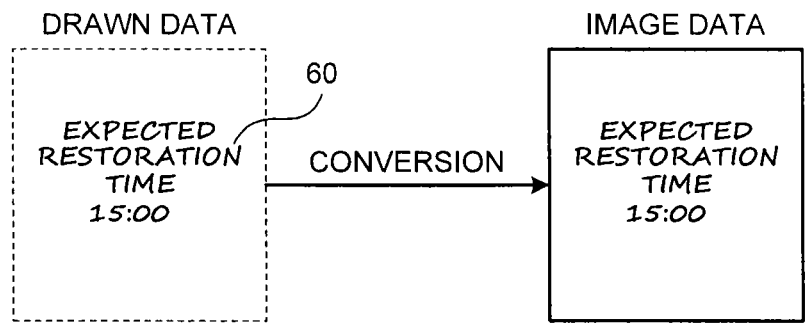
FIG. 18 is a diagram of the drawn data extracted without the background data, and image data.

FIG. 17 is a schematic of a first example of the electronic blackboard 20 displaying the selection line 61 drawn on the background data 82, and the rectangular area 62. FIG. 18 is a diagram of the drawn data extracted without the background data, and image data.

As illustrated in FIG. 17, the extracting unit 45 according to the first modification selects the drawn data 60 displayed in a manner superimposed on the background data 82 with the selection line 61. In this case, the extracting unit 45 extracts the drawn data 60 without the background data 82, for example. As illustrated in FIG. 18, the generating unit 46 generates image data based on the drawn data 60 without the background data 82. Thus, the electronic blackboard 20 according to the first modification extracts the drawn data 60 written by the user and transmits it to the terminal device 30.

Figure 19:
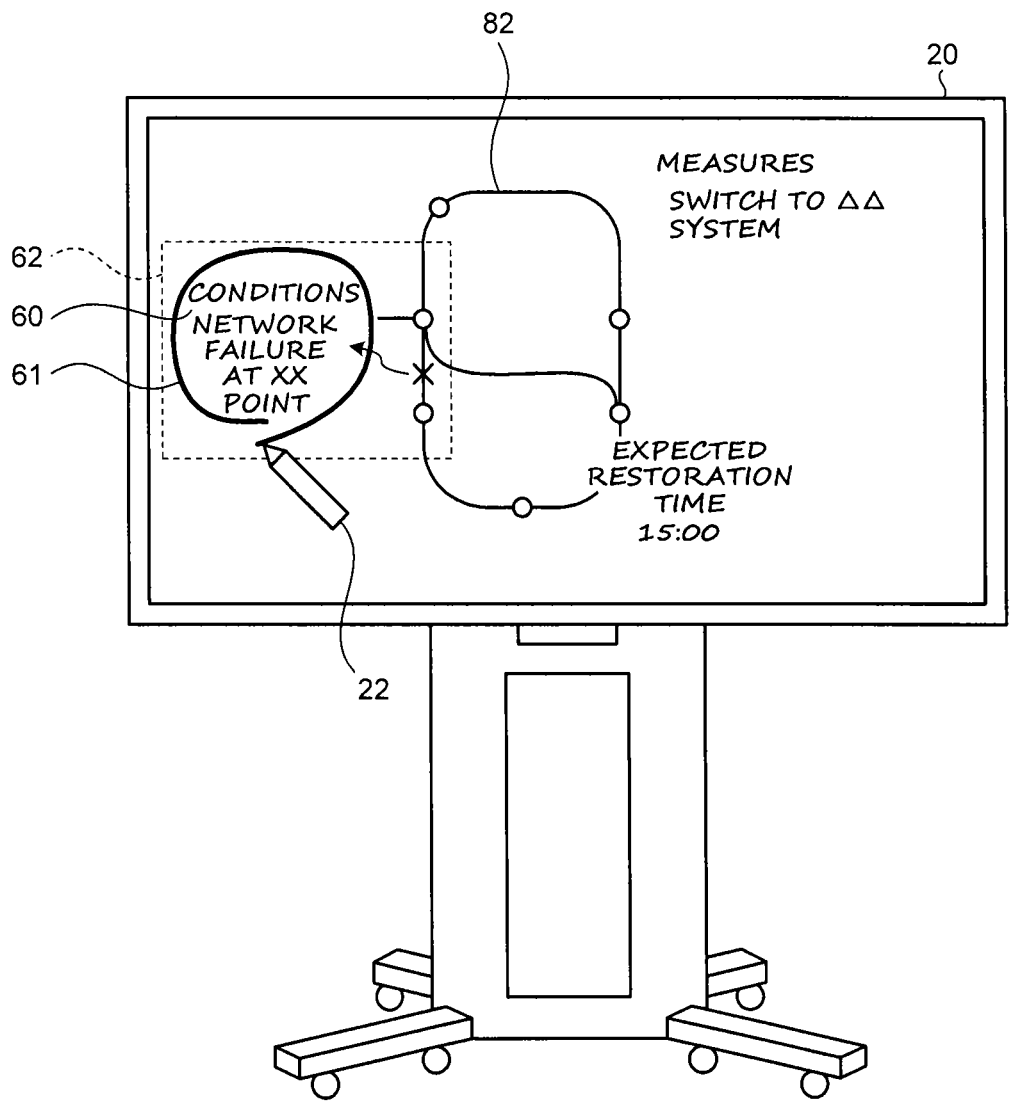
FIG. 19 is a schematic of a second example of the electronic blackboard displaying the selection line drawn on the background data, and the rectangular area.
Figure 20:
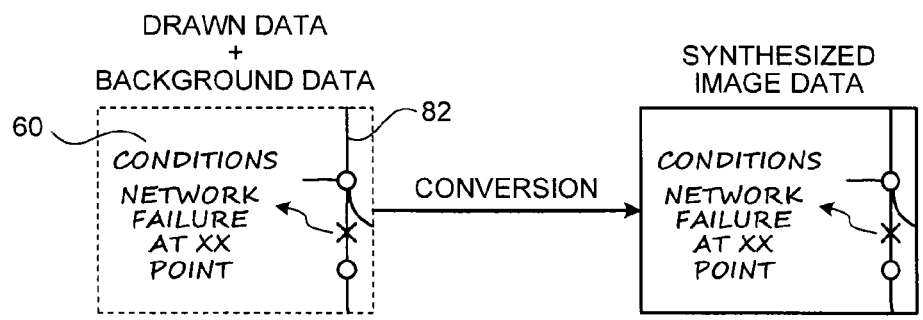
FIG. 20 is a diagram of the drawn data extracted together with the background data, and image data.

FIG. 19 is a schematic of a second example of the electronic blackboard 20 displaying the selection line 61 drawn on the background data 82, and the rectangular area 62. FIG. 20 is a diagram of the drawn data extracted together with the background data, and image data.

As illustrated in FIG. 19, the extracting unit 45 according to the first modification may cut and extract a part of the background data 82 in the area corresponding to the extracted drawn data 60 out of the background data 82 displayed on the screen together with the drawn data. In this case, the generating unit 46 generates image data by synthesizing the extracted part of the background data 82 and the extracted drawn data as illustrated in FIG. 20. Thus, the electronic blackboard 20 according to the first modification transmits a part of the background data 82 together with the drawn data 60 written by the user to the terminal device 30.

The electronic blackboard 20 may set in advance whether to generate image data by cutting out a part of the background data 82 and synthesizing it with the drawn data or generate image data without the background data 82. Alternatively, the electronic blackboard 20 may switch the setting depending on an operation performed by the user.

Figure 21:
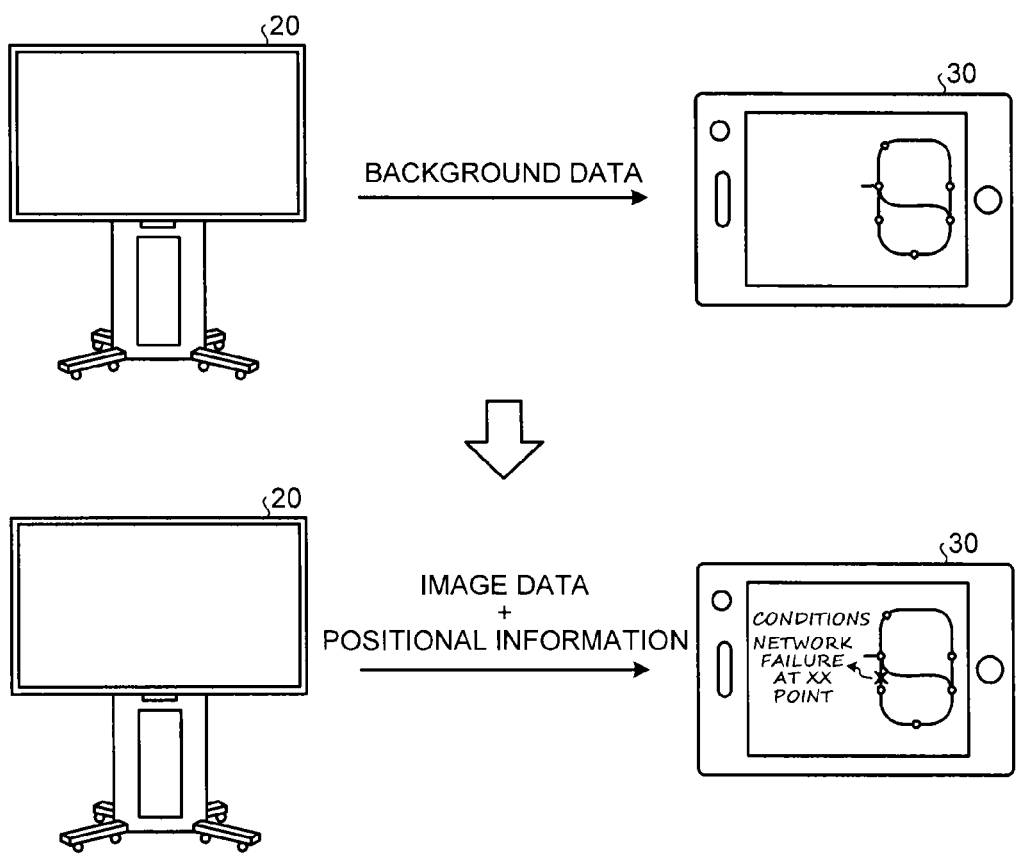
FIG. 21 is a schematic of an example in which the background data and the image data are separately transmitted to the terminal device.

FIG. 21 is a schematic of an example in which the background data and the image data are separately transmitted to the terminal device 30. The electronic blackboard 20 according to the first modification may transmit the background data and the image data simultaneously to the terminal device 30 or transmit them separately to the terminal device 30.

To transmit the background data and the image data separately to the terminal device 30, after a mode is selected and a session is formed, the transmitting unit 47 of the electronic blackboard 20, for example, transmits the background data alone to the terminal device 30 before the extraction of drawn data. When the drawn data is extracted, the generating unit 46 of the electronic blackboard 20 generates image data and positional information indicating the position of the area corresponding to the extracted drawn data with respect to the background data. The transmitting unit 47 transmits the image data and the positional information to the terminal device 30.

When receiving the image data and the positional information, the terminal device 30 displays the received image data in a manner superimposed at the position indicated by the positional information on the previously received background data. Thus, the electronic blackboard 20 transmits necessary information alone to the terminal device 30.

Second Modification

Figure 22:
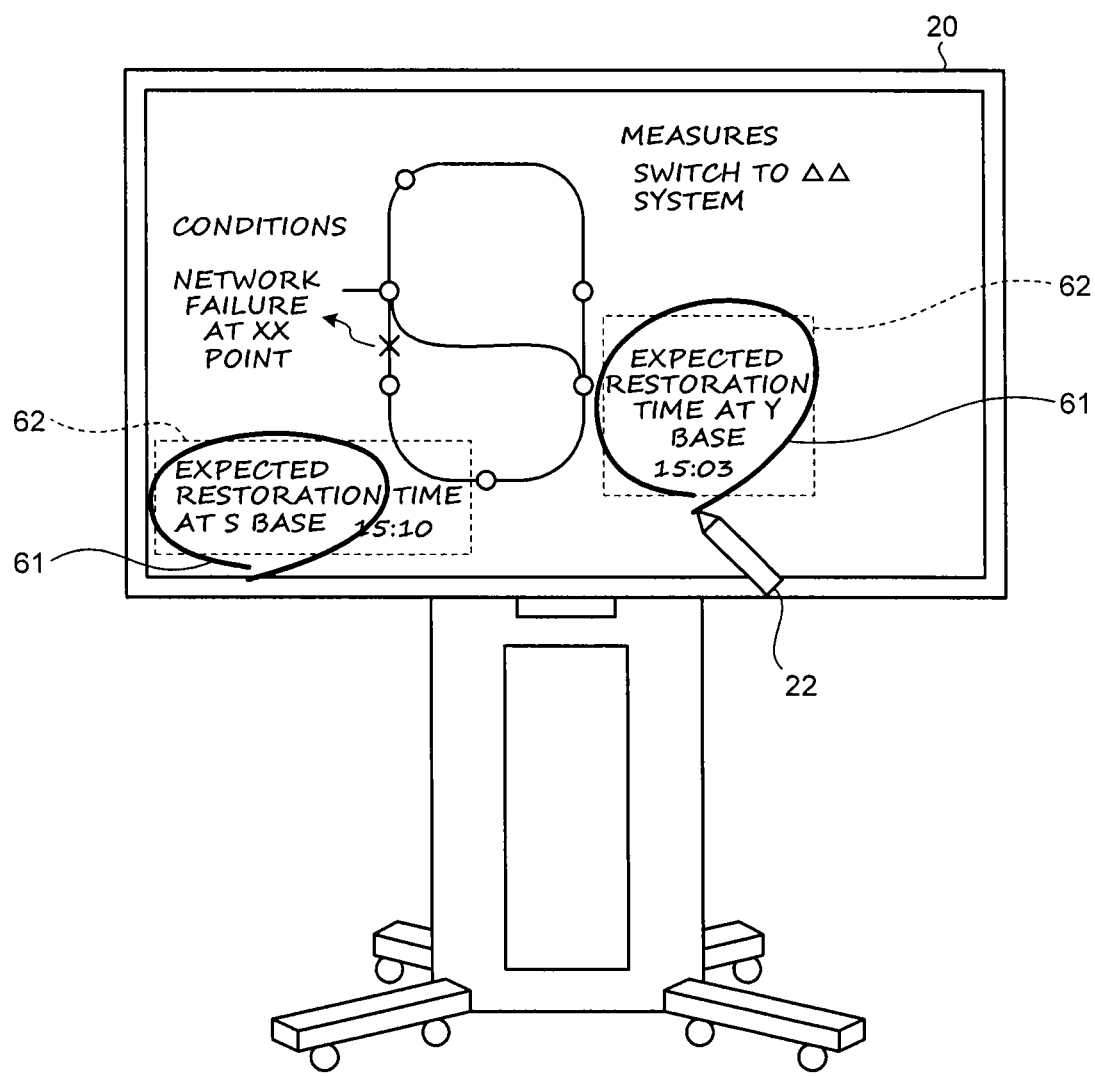
FIG. 22 is a schematic of the electronic blackboard according to a second modification.

FIG. 22 is a schematic of the electronic blackboard 20 according to a second modification. The transmission system 10 according to the second modification has a configuration and functions substantially the same as those described with reference to FIGS. 1 to 21. The following describes differences from the configuration described with reference to FIGS. 1 to 21.

In a case where the user selects a plurality of areas on the screen, the extracting unit 45 according to the second modification extracts pieces of drawn data displayed in the areas selected by the user.

The input unit 41, for example, receives the positions of a plurality of substantially circular selection lines 61 drawn by the user on the screen with the electronic pen 22. The extracting unit 45 extracts pieces of drawn data in the rectangular areas 62 including the areas surrounded by the respective selection lines 61. In this case, the rectangular areas 62 need not have the aspect ratio of the screen of the terminal device 30.

Figure 23:
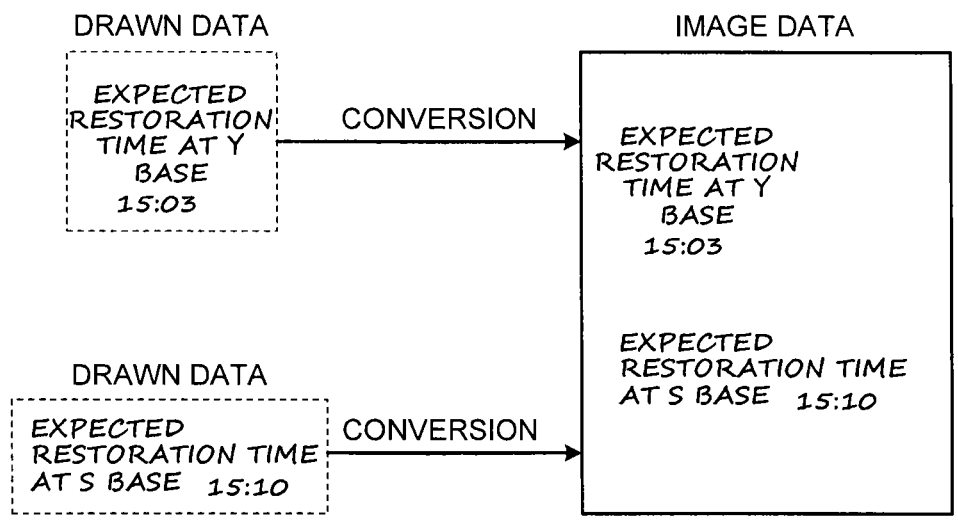
FIG. 23 is a diagram of processing of synthesizing a plurality of pieces of extracted drawn data into a piece of image data.

As illustrated in FIG. 23, the generating unit 46 synthesizes the pieces of drawn data extracted from the respective areas into a piece of image data in a form with a preset aspect ratio corresponding to the screen of the terminal device 30. Thus, the electronic blackboard 20 according to the second modification transmits and displays the pieces of information written in the respective areas on the terminal device 30.

Figure 24:
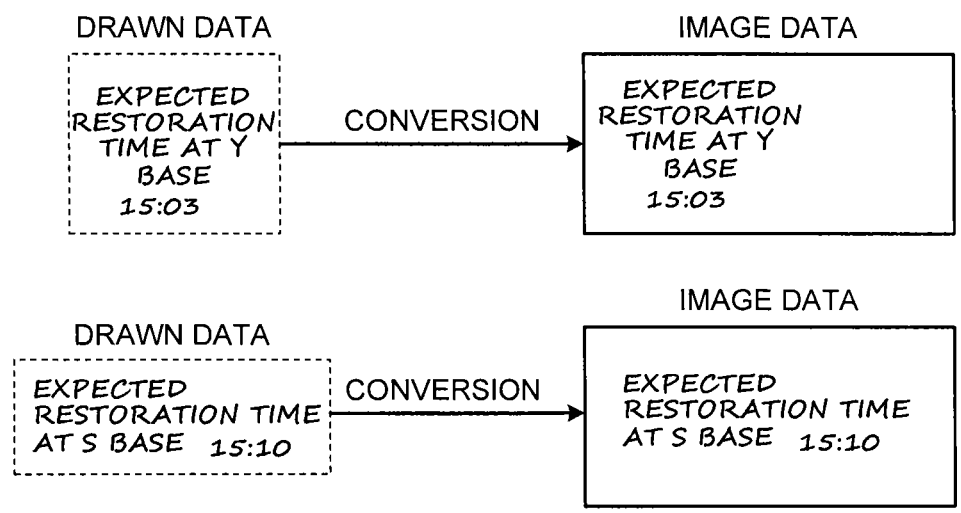
FIG. 24 is a diagram of processing of converting the pieces of extracted drawn data into respective pieces of image data.

As illustrated in FIG. 24, the generating unit 46 may convert the pieces of drawn data extracted from the areas into respective pieces of image data. In this case, the transmitting unit 47 transmits each of the pieces of image data to the terminal device 30. The terminal device 30 receives the pieces of image data from the electronic blackboard 20. When receiving the pieces of image data, the terminal device 30 displays the pieces of image data on different pages. When the user performs an operation of turning or returning a page, the terminal device 30 switches display of the image data. Thus, the electronic blackboard 20 according to the second modification transmits and displays the pieces of information written in the respective areas on the terminal device 30.

Figure 25:
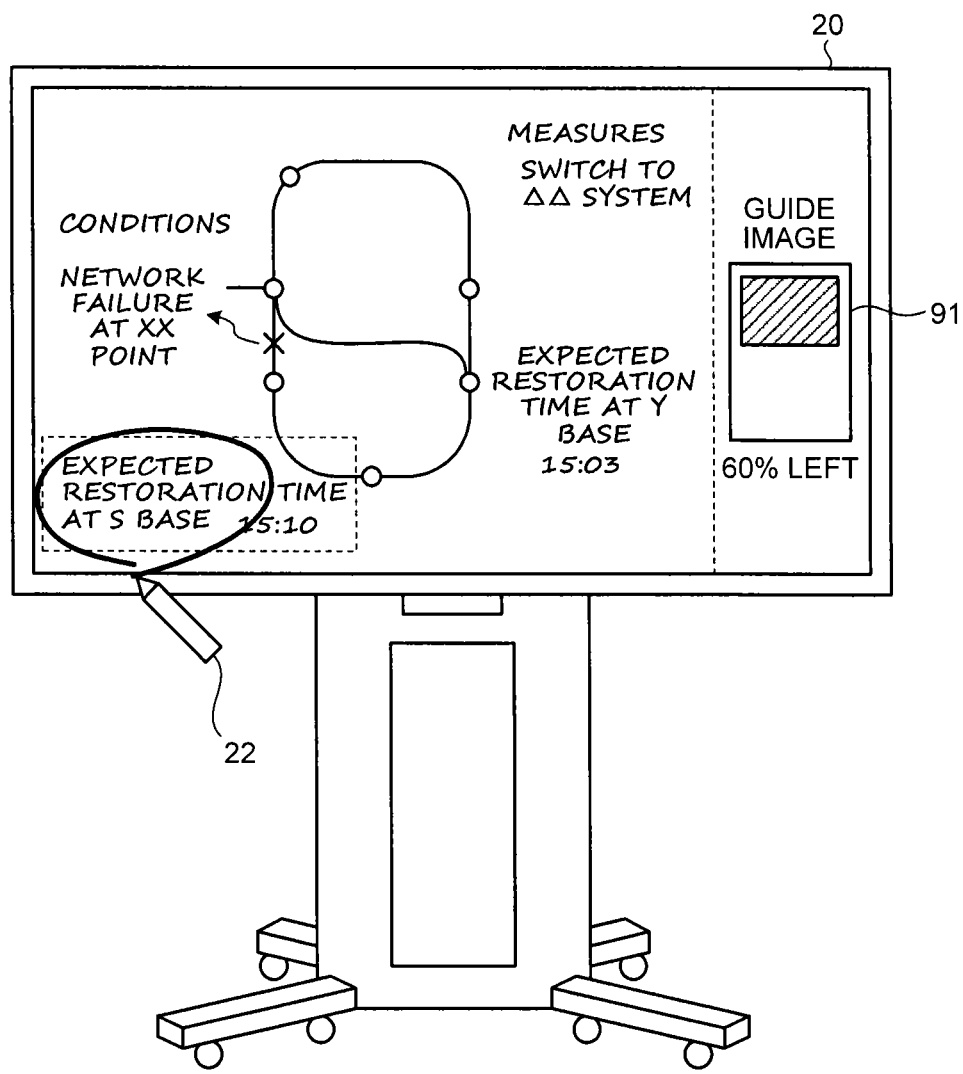
FIG. 25 is a schematic of the electronic blackboard displaying a guide image.

FIG. 25 is a schematic of the electronic blackboard 20 displaying a guide image 91. To generate a piece of image data by synthesizing pieces of drawn data selected from a plurality of areas, the extracting unit 45 according to the second modification may generate and display the guide image 91 on the screen during the operation of selecting drawn data. The guide image 91 indicates arrangement of the selected drawn data on a preset form.

The extracting unit 45, for example, displays the guide image 91 on an end of the screen. The guide image 91, for example, is used to display an area indicating a form corresponding to the aspect ratio of the screen of the terminal device 30. The extracting unit 45, for example, displays the guide image 91 including an area to which the selected drawn data is to be allocated as a hatching image. The extracting unit 45 may display a percentage of a free space to which no selected drawn data is allocated together with the guide image 91. Thus, to synthesize a plurality of pieces of drawn data into a piece of image data, the electronic blackboard 20 can cause the user to select an appropriate number of pieces of drawn data. The extracting unit 45 may extract a part of the drawn data moved into the area indicated by the guide image 91 in response to an operation performed by the user. The extracting unit 45, for example, may extract a part of the drawn data in response to the user's operation of directly moving the selected drawn data (e.g., movement by a drag-and-drop operation).

Before the selection of drawn data, the extracting unit 45 may cause the user to input the number of areas of drawn data to be selected. In this case, the extracting unit 45 may display divided areas of the number corresponding to the number of areas input by the user in the guide image 91. In a case where the number of areas input by the user is four, for example, the extracting unit 45 displays the guide image 91 including divided areas obtained by dividing the whole area crosswise into four. The extracting unit 45 allocates pieces of drawn data extracted from respective areas to the respective divided areas. Thus, the electronic blackboard 20 can cause the user to select drawn data capable of being arranged in the preset divided areas.

Third Modification

Figures 26, 27:
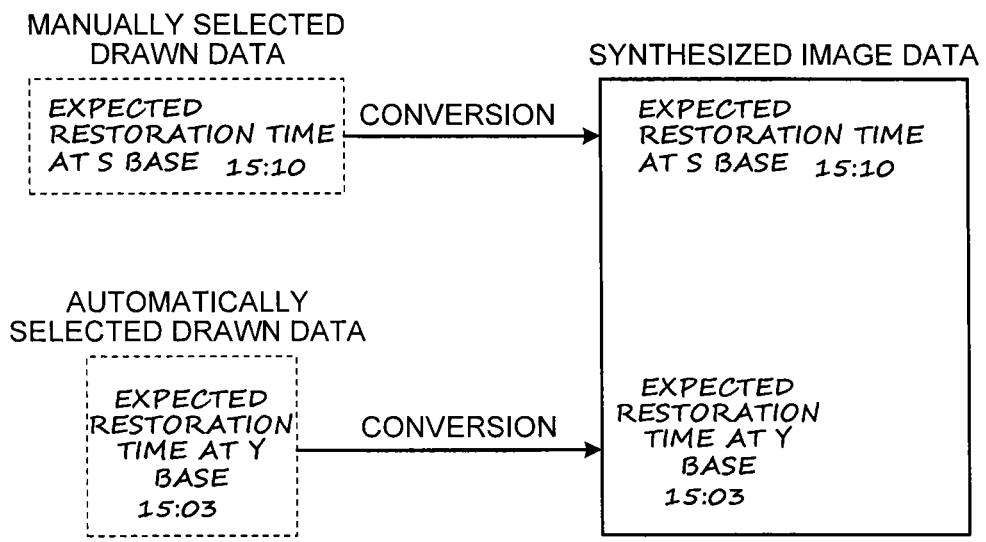
FIG. 26 is a diagram of an example of drawn data stored in a storage unit of the electronic blackboard according to a third modification.
FIG. 27 is a diagram of processing of synthesizing manually selected drawn data and automatically selected drawn data.

FIG. 26 is a diagram of an example of drawn data stored in the storage unit 43 of the electronic blackboard 20 according to a third modification. The transmission system 10 according to the third modification has a configuration and functions substantially the same as those described with reference to FIGS. 1 to 25. The following describes differences from the configuration described with reference to FIGS. 1 to 25.

The drawing unit 42 according to the third modification adds time to each drawn data. As illustrated in FIG. 26, the storage unit 43 stores therein the drawn data and the time in a manner associated with each other. The drawing unit 42 may add time in units of characters or stroke data smaller than drawn data.

When the user selects drawn data, the extracting unit 45 extracts the drawn data selected by the user and another piece of drawn data generated within a preset time period from the selection of the selected drawn data. The extracting unit 45, for example, refers to the added time to extract drawn data generated within five minutes before and after the selection of the selected drawn data.

The generating unit 46 synthesizes the pieces of drawn data extracted from the respective areas into a piece of image data in a preset form corresponding to the screen of the terminal device 30. As illustrated in FIG. 27, for example, the generating unit 46 synthesizes drawn data manually selected by the user and automatically selected drawn data into a piece of image data. The transmitting unit 47 transmits the generated image data to the terminal device 30.

The transmission system 10 according to the third modification can automatically select relating information written around the same time and transmit it to the terminal device 30.

Other Modifications

While the terminal devices 30 according to the present embodiment each include the output unit 52 having the same screen size, the terminal devices 30 may have different screen sizes. In this case, the electronic blackboard 20 generates image data corresponding to the screen size of a certain terminal device 30 and transmits it to the terminal devices 30. If a terminal device 30 receives image data in a screen size different from that of the output unit 52 included in the terminal device 30, it reduces and displays the image data, for example. The electronic blackboard 20 may generate pieces of image data in a plurality types of screen sizes corresponding to the respective terminal devices 30 and transmit the pieces of image data in the respective screen sizes to the corresponding terminal devices 30.

The terminal device 30 may be an ultra-compact watch-like device, for example. In this case, the terminal device 30 may display important information out of the image data transmitted from the electronic blackboard 20 and need not display other information. Whether or not the information is important is specified by the user of the electronic blackboard 20 when selecting the drawn data, for example. In this case, the terminal device 30 may request the electronic blackboard 20 to retransmit the non-displayed image data later. If retransmission is requested, the electronic blackboard 20 transmits the specified image data to the terminal device 30.

The terminal device 30 may be a printing device that prints image data on a sheet. In this case, the electronic blackboard 20 generates image data with an aspect ratio corresponding to the size of the sheet output from the terminal device 30. When receiving the image data from the electronic blackboard 20, the terminal device 30 prints the received image data on a sheet.

The embodiments of the present invention can convert information displayed on a screen into image data easily checked on a terminal device and transmit it to the terminal device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

What is claimed is:

1. A display device that communicates with a terminal device, the display device comprising:
   a display that displays, on a screen, display data including at least one of image data and drawn data corresponding to an operation performed by a user; and
   circuitry configured to perform:
   extracting a part of the display data specified by the user out of the display data displayed by the display;
   generating image data in a form corresponding to the terminal device based on the extracted display data;
   transmitting the image data to the terminal device;
   acquiring background data,
   wherein:
   the display displays the background data on the screen,
   the extracting cuts and extracts a part of the background data in an area corresponding to the extracted display data out of the background data displayed on the screen, and the generating generates the image data by synthesizing the extracted part of the background data and the extracted display data.

2. The display device according to claim 1, wherein the generating generates the image data in the form corresponding to the terminal device based on information received from the terminal device.

3. The display device according to claim 1, further comprising:
circuitry that receives a position of a selection line drawn by the user on the screen,
wherein the extracting sets a rectangular area that includes all the display data at least a part of which overlaps with an area surrounded by the selection line.

4. The display device according to claim 3, wherein:
an aspect ratio corresponds to the terminal device, and
the generating generates the image data having the aspect ratio.

5. The display device according to claim 1, further comprising:
circuitry that generates the drawn data, and generates an aggregate of vector stroke data indicating a trajectory of the operation performed by the user as the drawn data.

6. The display device according to claim 5, wherein:
the generating generates raster image data with resolution corresponding to a display of the terminal device based on the drawn data.

7. The display device according to claim 5, wherein:
when the terminal device is capable of displaying vector image data, the generating generates vector image data corresponding to a form of a screen of the terminal device based on the drawn data.

8. The display device according to claim 1, wherein the circuitry further performs:
receiving a mode indicating contents of an operation,
wherein the display device further comprises session forming circuitry communicably connected to the terminal device specified based on the mode,
wherein the transmitting transmits the image data to the terminal device that is communicably connected.

9. The display device according to claim 1, wherein:
the generating generates positional information indicating a position of an area corresponding to the extracted display data with respect to the background data, and
the transmitting transmits the background data, the image data, and the positional information to the terminal device.

10. The display device according to claim 9, wherein:
the transmitting transmits the background data to the terminal device before extraction of the display data.

11. The display device according to claim 1, wherein:
the extracting extracts a plurality of pieces of display data displayed in a plurality of areas selected by the user.

12. The display device according to claim 11, wherein:
the generating converts the pieces of display data extracted from the areas into respective pieces of image data.

13. The display device according to claim 1, wherein:
the extracting extracts a part of the display data moved into an area based on the form corresponding to the terminal device in response to an operation performed by the user.

14. The display device according to claim 1, wherein:
the terminal device is a printing device that prints an image that is received.

15. A display device that communicates with a terminal device, the display device comprising:
a display that displays, on a screen, display data including at least one of image data and drawn data corresponding to an operation performed by a user; and
circuitry configured to perform:
extracting a part of the display data specified by the user out of the display data displayed by the display;
generating image data in a form corresponding to the terminal device based on the extracted display data; and
transmitting the image data to the terminal device
wherein:
the extracting extracts a plurality of pieces of display data displayed in a plurality of areas selected by the user,
the generating synthesizes the pieces of display data extracted from the areas into a piece of image data in a preset form corresponding to the terminal device, and
during an operation of selecting the pieces of display data performed by the user, the extracting generates a guide image indicating arrangement of the selected display data on the preset form and displays the guide image on the screen.

16. A display device that communicates with a terminal device, the display device comprising:
a display that displays, on a screen, display data including at least one of image data and drawn data corresponding to an operation performed by a user; and
circuitry configured to perform:
extracting a part of the display data specified by the user out of the display data displayed by the display;
generating image data in a form corresponding to the terminal device based on the extracted display data;
transmitting the image data to the terminal device; and
generating the drawn data by adding time at which the drawn data is generated to the drawn data,
wherein:
the extracting extracts the drawn data selected by the user and another piece of drawn data generated within a preset time period from selection of the selected drawn data, and
the generating of image data synthesizes the pieces of drawn data extracted from a plurality of areas into a piece of image data in a preset form corresponding to the terminal device.

* * * * *